US012397521B2

(12) United States Patent
Marvelley

(10) Patent No.: US 12,397,521 B2
(45) Date of Patent: Aug. 26, 2025

(54) CONVEYOR BELT END ENCAPSULATION SYSTEMS AND METHODS

(71) Applicant: ContiTech Deutschland GmbH, Hannover (DE)

(72) Inventor: Scott Marvelley, Bayswater (AU)

(73) Assignee: ContiTech Deutschland GmbH, Hannover (DE)

( * ) Notice: Subject to any disclaimer, the term of this patent is extended or adjusted under 35 U.S.C. 154(b) by 408 days.

(21) Appl. No.: 17/448,062

(22) Filed: Sep. 20, 2021

(65) Prior Publication Data

US 2023/0093030 A1 Mar. 23, 2023

(51) Int. Cl.
*B29D 29/06* (2006.01)
(52) U.S. Cl.
CPC .................... *B29D 29/06* (2013.01)
(58) Field of Classification Search
None
See application file for complete search history.

(56) References Cited

U.S. PATENT DOCUMENTS

| | | | |
|---|---|---|---|
| 6,988,610 B2 | 1/2006 | Fromme et al. | |
| 7,165,293 B2 | 1/2007 | Musil et al. | |
| 8,662,290 B2 | 3/2014 | Twigger et al. | |
| 9,033,137 B2 | 5/2015 | Koppes et al. | |
| 2009/0226121 A1* | 9/2009 | Veder | B65D 31/10 |
| | | | 383/210 |
| 2013/0213774 A1 | 8/2013 | Huels | |
| 2018/0305128 A1* | 10/2018 | Hou | B65G 15/40 |

FOREIGN PATENT DOCUMENTS

| | | |
|---|---|---|
| GB | 2118583 A | 11/1983 |
| WO | WO-2019071363 A1 * | 4/2019 |

OTHER PUBLICATIONS

Sparks Belting, How to Properly Store Conveyor Belts, https://www.sparksbelting.com/blog/how-to-properly-store-your-conveyor-belts, Dec. 2017, Accessed Mar. 18, 2024 (Year: 2017).*
SemperTrans, Storage and Handling of Conveyor Belts, https://conveyor-belts.semperitgroup.com/fileadmin/user_upload/MediaLibrary/ConveyorBelts/Media/Downloads/Sempertrans_Belt_Storage_Instructions_extern_web_May2019.pdf, May 2019, Accessed Mar. 18, 2024 (Year: 2019).*
Machine English translation of WO2019071363A1, Accessed Jul. 31, 2024 (Year: 2019).*
Carlson et al, Long-Term Conveyor Storage: Best Practices, https://feeco.com/long-term-conveyor-storage-best-practices/, Apr. 2018, Accessed Nov. 13, 2024. (Year: 2018).*
The International Search Report and the Written Opinion of the International Searching Authority mailed on Dec. 15, 2022 for the counterpart PCT Application No. PCT/ep2022/074804.

* cited by examiner

Primary Examiner — Abbas Rashid
Assistant Examiner — Adrianna N Konves
(74) Attorney, Agent, or Firm — Gregory Adams; Richard A. Wolf

(57) ABSTRACT

One general aspect includes a method for generating an encapsulated belt containment system. The method also includes cutting a belt and removing rubber material from a portion of the belt to generate exposed belt end. The method also includes removing excess material from exposed cables of the exposed belt end. The method also includes organizing exposed cables into a plurality of cable groups and secure each group. The method also includes inserting the plurality of cable groups into a containment bag.

12 Claims, 10 Drawing Sheets

CONVEYOR BELT END ENCAPSULATION SYSTEMS AND METHODS

FIELD

The field to which the disclosure generally relates is rubber products, such as conveyor belts.

BACKGROUND

Conveyor belt systems utilize a conveyor belt to transport a material from one location to another. Conveyor belts are used in many applications, such as mining, assembly, people transport, goods transport and the like.

During operation and over time, the conveyor belt will wear and can be damaged. Once the belt has reached its end-of-life or is damaged, one or more portions of the conveyor belt may need to be repaired or completely replaced.

To facilitate the replacement of either a portion of, or the entirety of the total belt length, a singular splice or multiple belt splices are made to join the belt segments together.

As the splicing process is time-consuming, procedures and technologies are needed to reduce the amount of time that is required during a plant shut-down or break-down situation whilst not impacting on the finished quality of the completed join.

DETAILED DESCRIPTION

Figure 1:
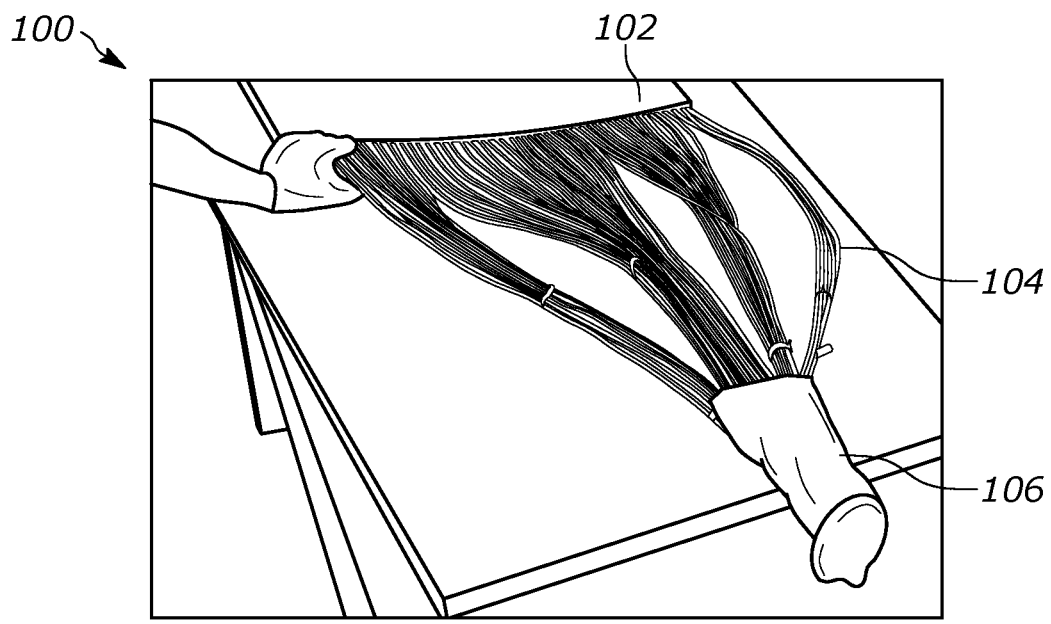
FIG. 1 is a diagram illustrating a partially encapsulated belt-end for a belt containment system 100 in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Conveyor belt systems utilize a conveyor belt to transport a material from one location to another. Conveyor belts are used in many applications, such as mining, assembly, people transport, goods transport and the like.

During operation and over time, the conveyor belt will wear and can be damaged. Once the belt has reached its end-of-life or is damaged, one or more portions of the conveyor belt may need to be repaired or completely replaced.

To facilitate the replacement of either a portion of, or the entirety of the total belt length, a singular splice or multiple belt splices are made to join the belt segments together.

A good way to reduce the amount of time taken to complete a splice during a plant shut-down is to complete some sub-tasks ahead of the shut-down. However, in doing this, the belt-ends (including the carcass and inside gum materials) can be contaminated and/or damaged prior to performing the splice. As a result, an installed splice can be structurally compromised and lead to additional issues for the conveyor belt system.

What is needed is a technique to mitigate contamination and/or damage to belt ends prior to splicing.

One or more embodiments are provided that mitigate contamination and/or damage to belt ends prior to splicing. Further, one or more embodiments are provided that provide encapsulated belt end containment and permit storage of belt ends for splicing.

FIG. 1 is a diagram illustrating a partially encapsulated belt for a belt containment system 100 in accordance with one or more embodiments. The diagram is provided for illustrative purposes and it is appreciated that suitable variations are contemplated.

The containment system 100 is configured to protect rubber conveyor belt materials and surfaces.

This containment system 100 is designed to help protect rubber conveyor belt materials and surfaces from exposure to environmental effects and contaminants. These effects can be detrimental to the quality and integrity of a belt splice.

This containment system 100 can be employed to aid in the 'preparation' of conveyor belt ends with the aim of reducing the time taken to splice conveyor belt during mine maintenance shutdowns and belt changeouts.

Testing has demonstrated that a rubber conveyor belt-end can be partially prepared with steel cord cables or fabric ply removed from rubber covers. Then, the belt end is 'encapsulated' using appropriate containment materials under controlled conditions to produce a state whereby the exposed cables can be protected against environmental effects to produce a favorable result when tested in accordance with applicable standards, such as Australian Standards AS1333 & AS1332.

If a belt-end is prepared and encapsulated using system 100, the quality outcome of the belt splice may be based on the adherence to the belt manufactures splicing procedures and adherence to encapsulation supplier's guidelines.

It is appreciated that suitable variations in the system 100 are contemplated.

The system 100 is shown with a belt splice having a belt or belt portion 102, exposed steel cables 104, and a wire encapsulant bag 106.

The belt 102 comprises a plurality of layers and the steel cables 104. It is appreciated that other suitable reinforcement materials can be used in place of the steel cables 104.

The system 100 and other aspects/embodiments are described with an elastomeric or rubber belt based conveyor belt. However, it is appreciated that the belt 102 can comprise other suitable materials including woven, textile materials, and the like.

Figure 2A:
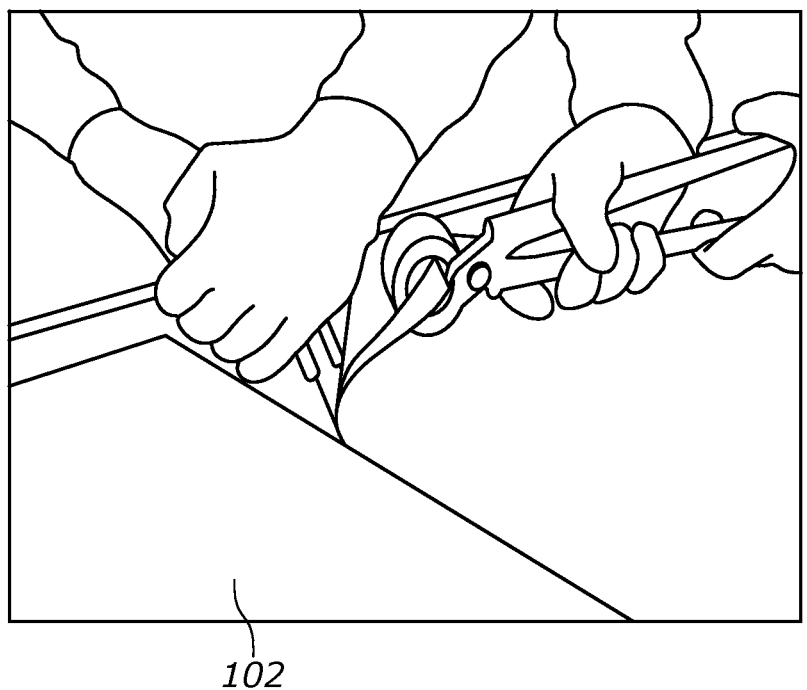
FIG. 2A-2N illustrate stages of generating the encapsulated belt containment system 100 according to a method 300.
Figure 2B:
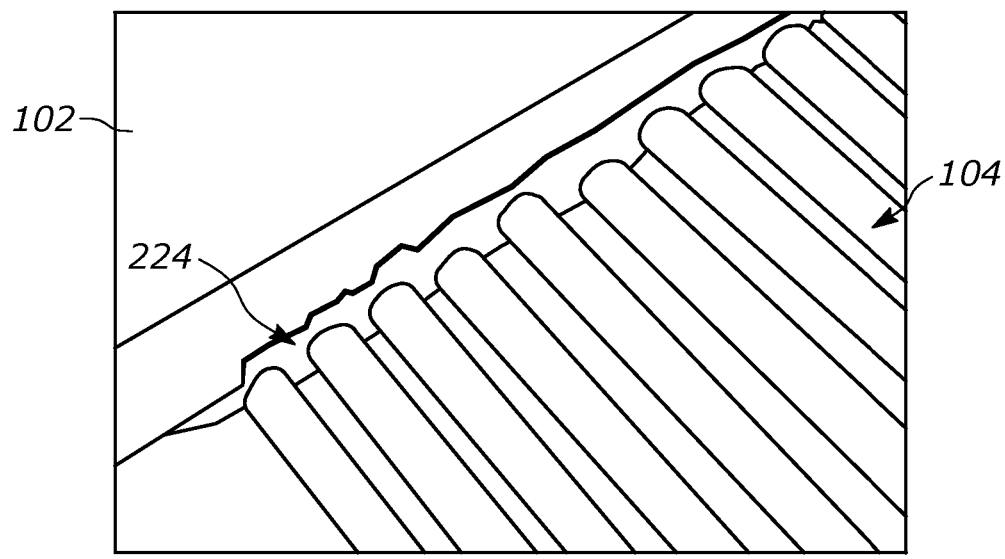
Figure 2C:
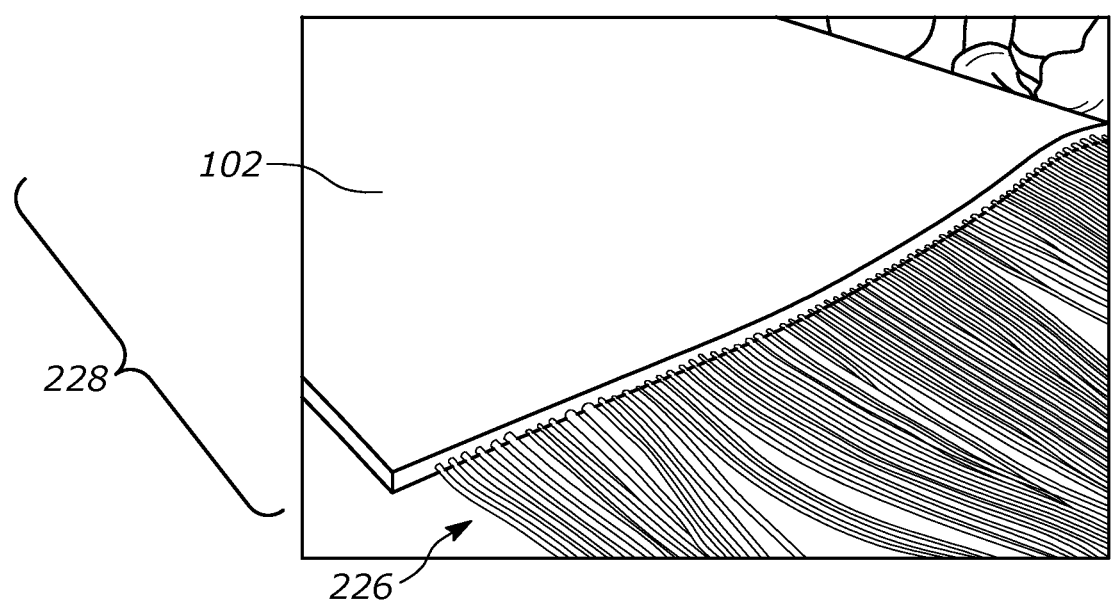
Figure 2D:
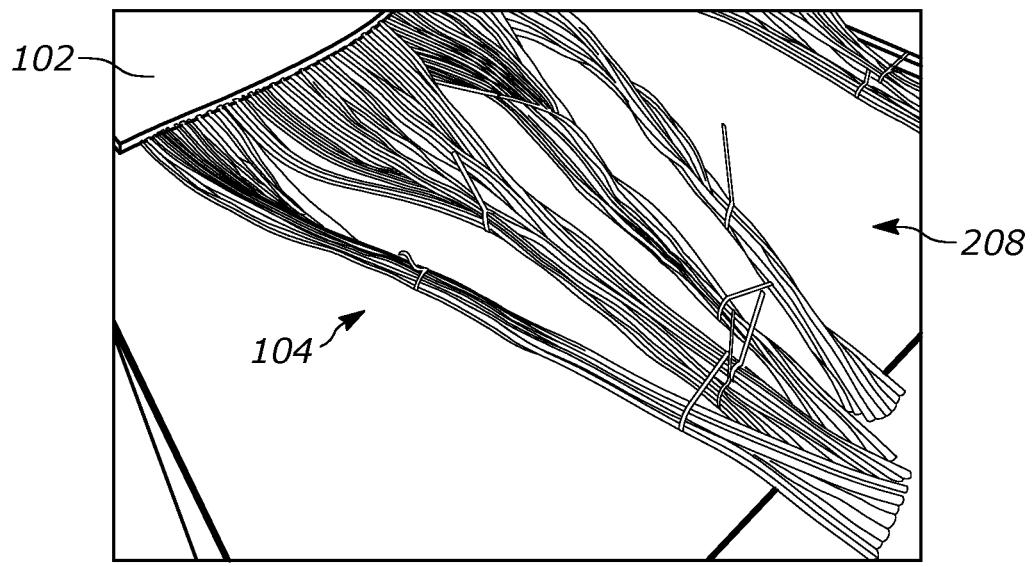
Figure 2E:
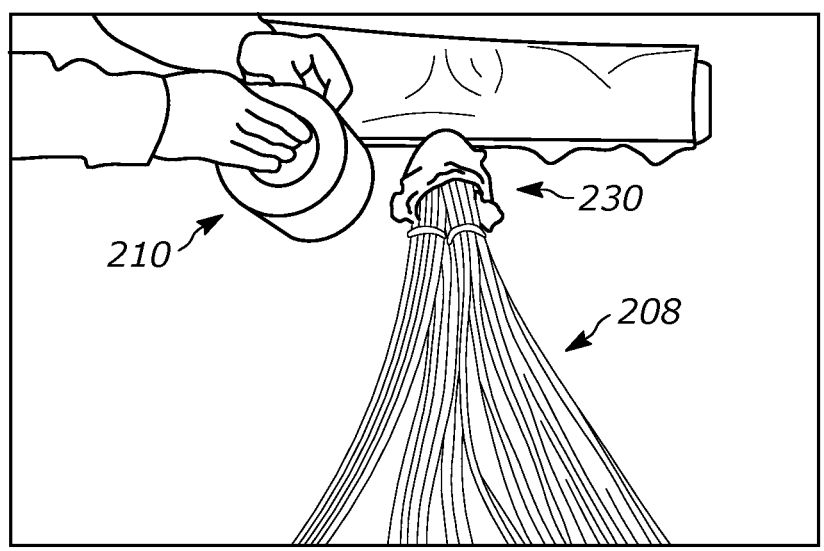
Figure 2F:
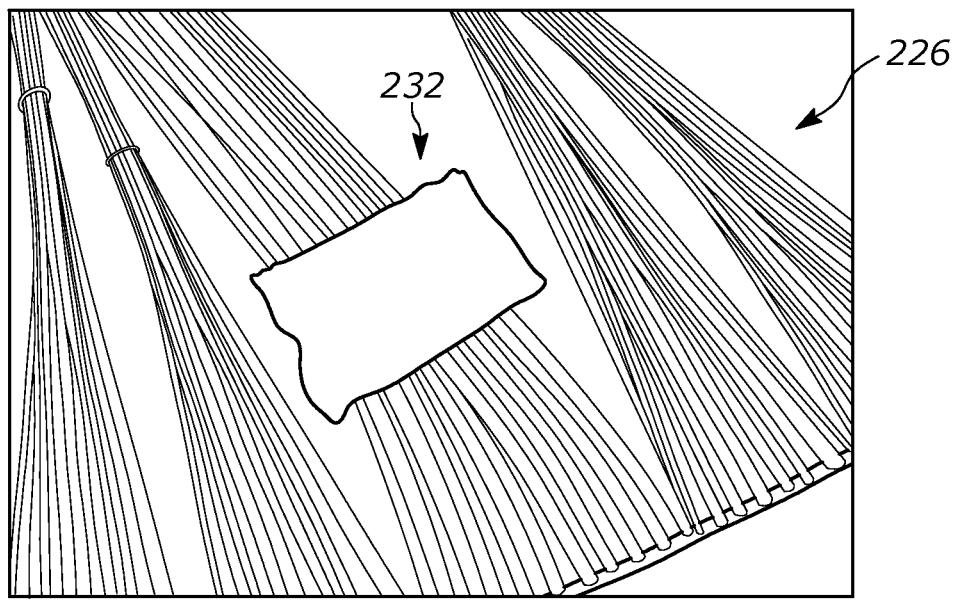
Figure 2G:
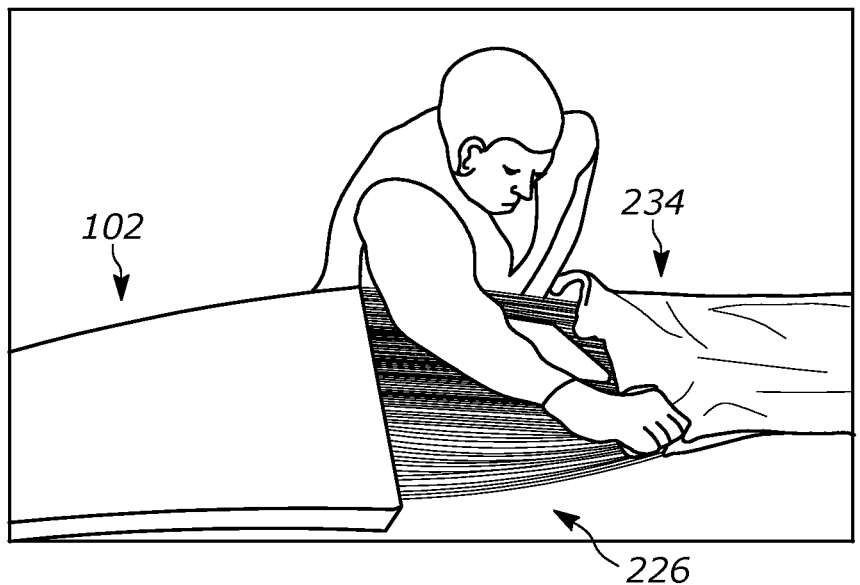
Figure 2H:
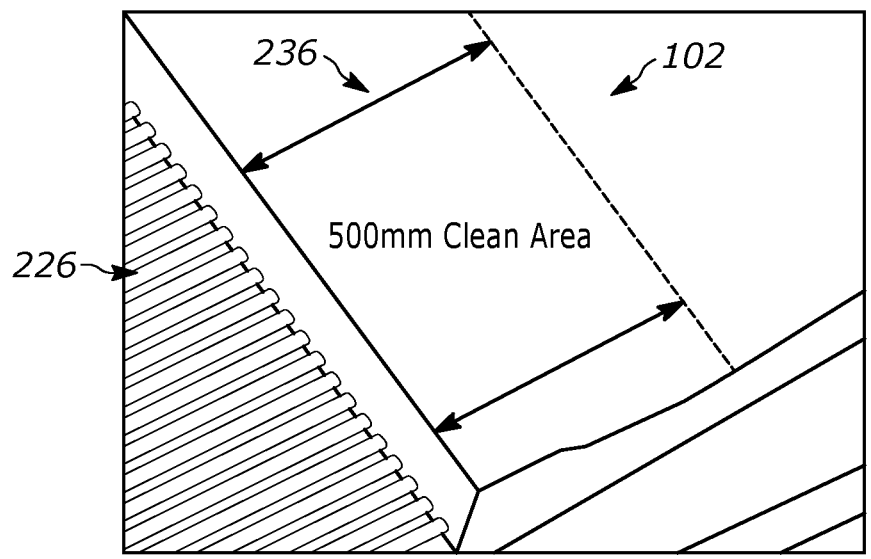
Figure 2I:
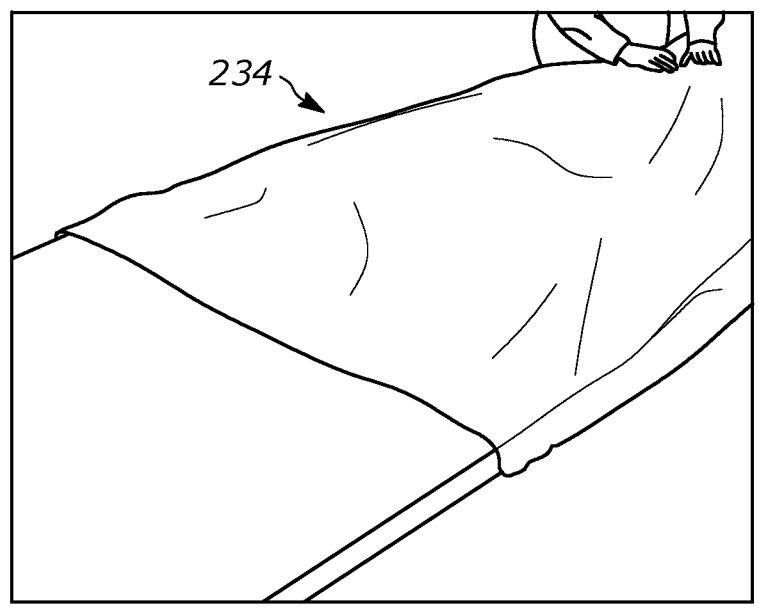
Figure 2J:
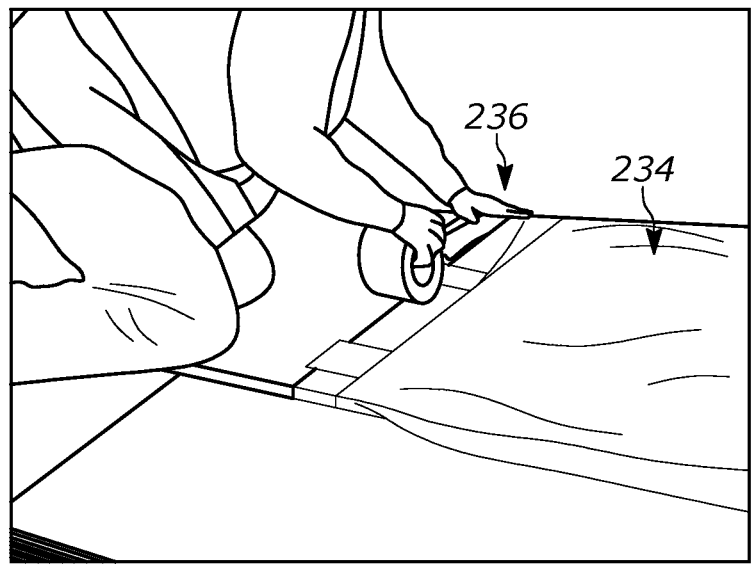
Figure 2K:
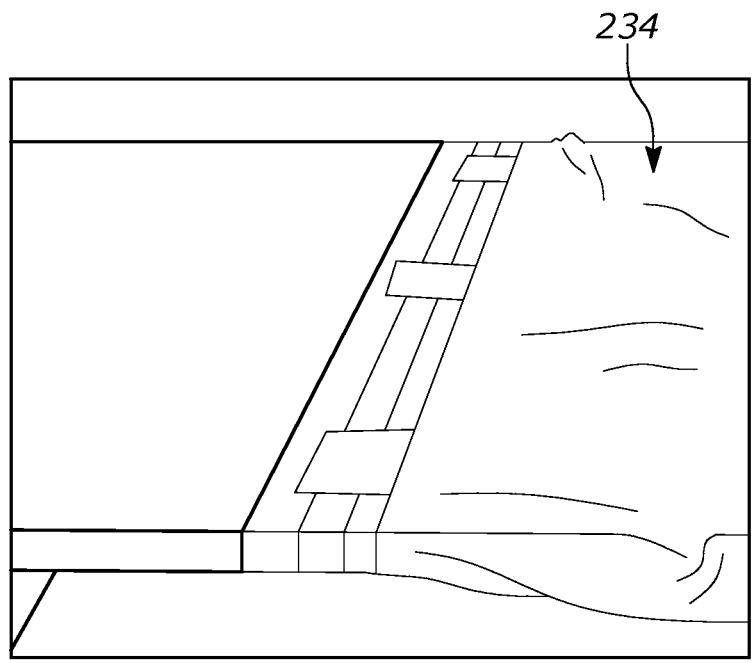
Figure 2L:
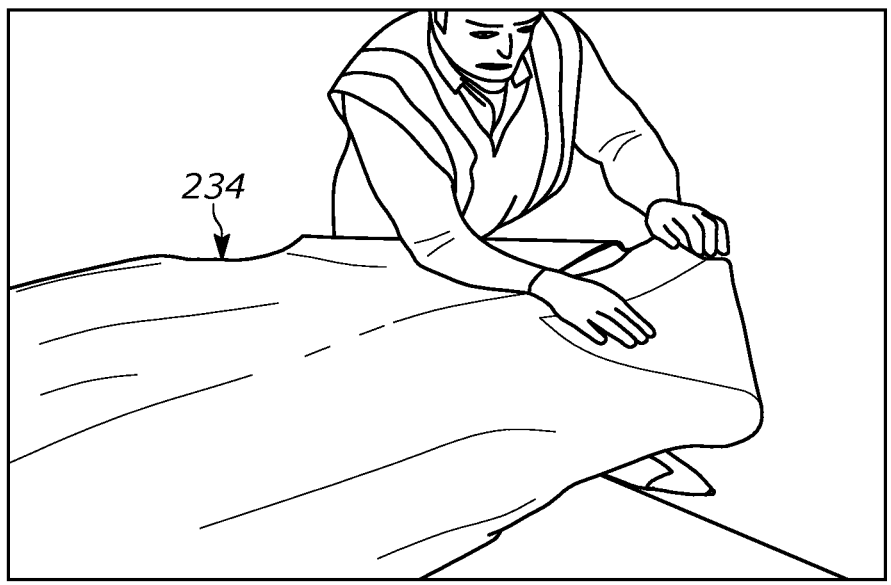
Figure 2M:
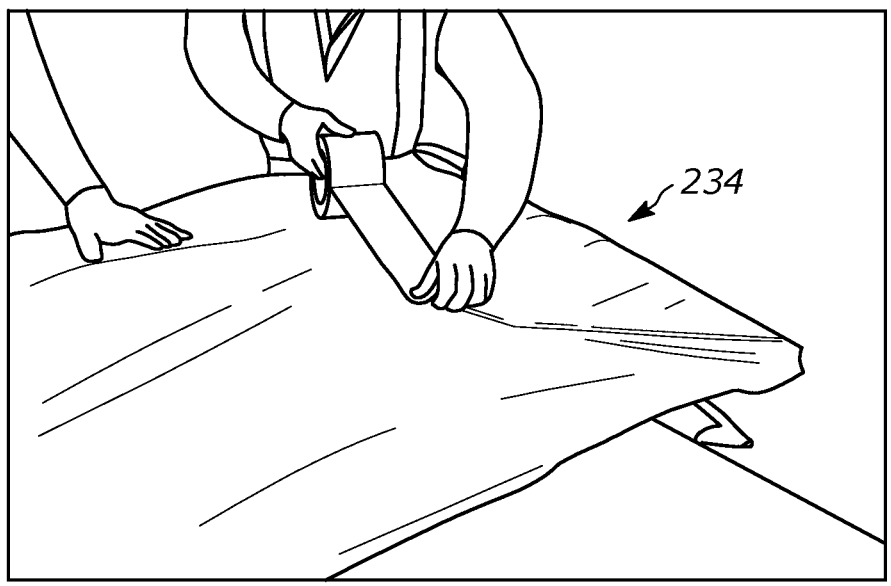
Figure 2N:
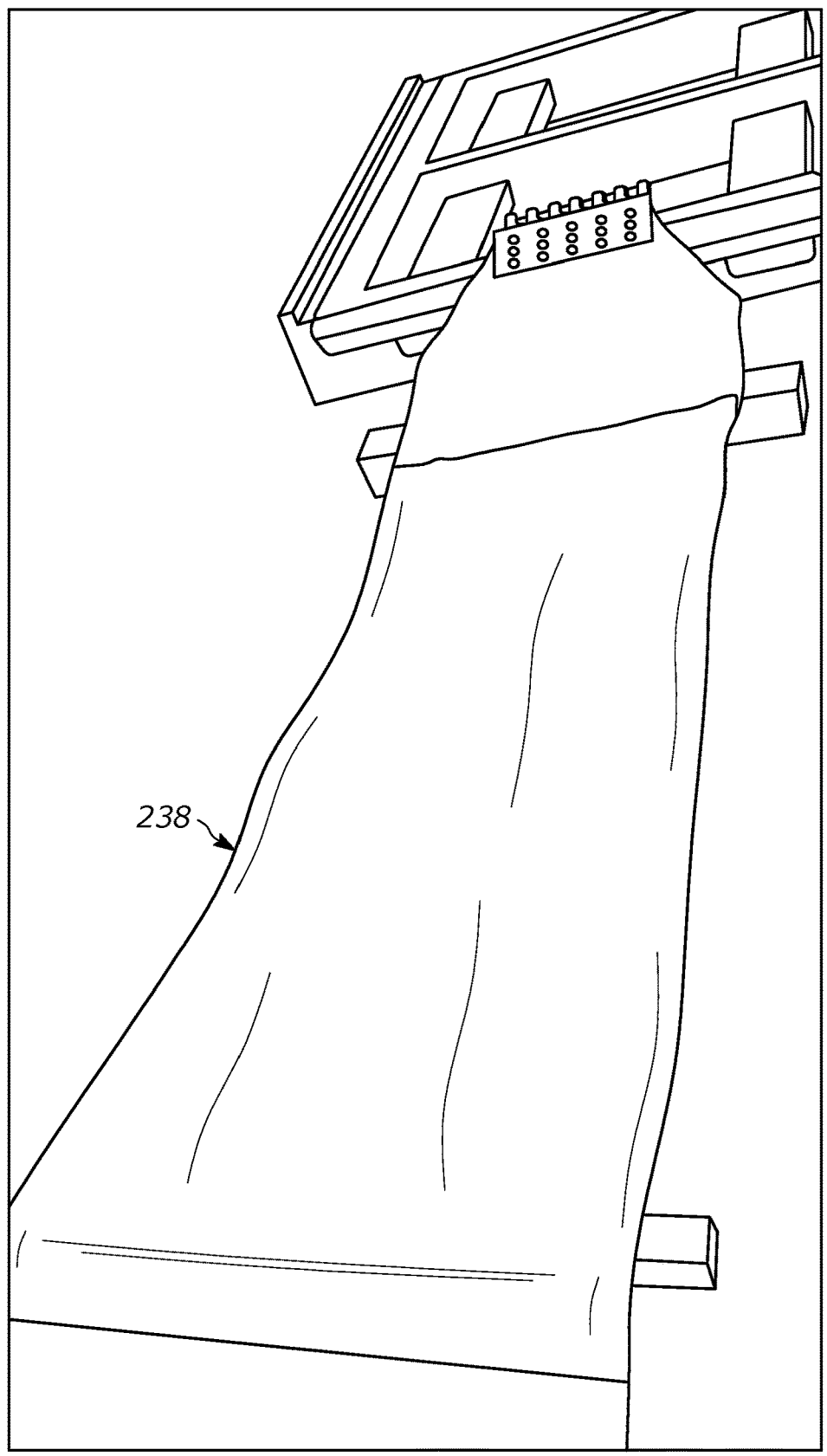

FIG. 2A-2N illustrate stages of generating the encapsulated belt containment system 100 according to a method 300.

Figure 3:
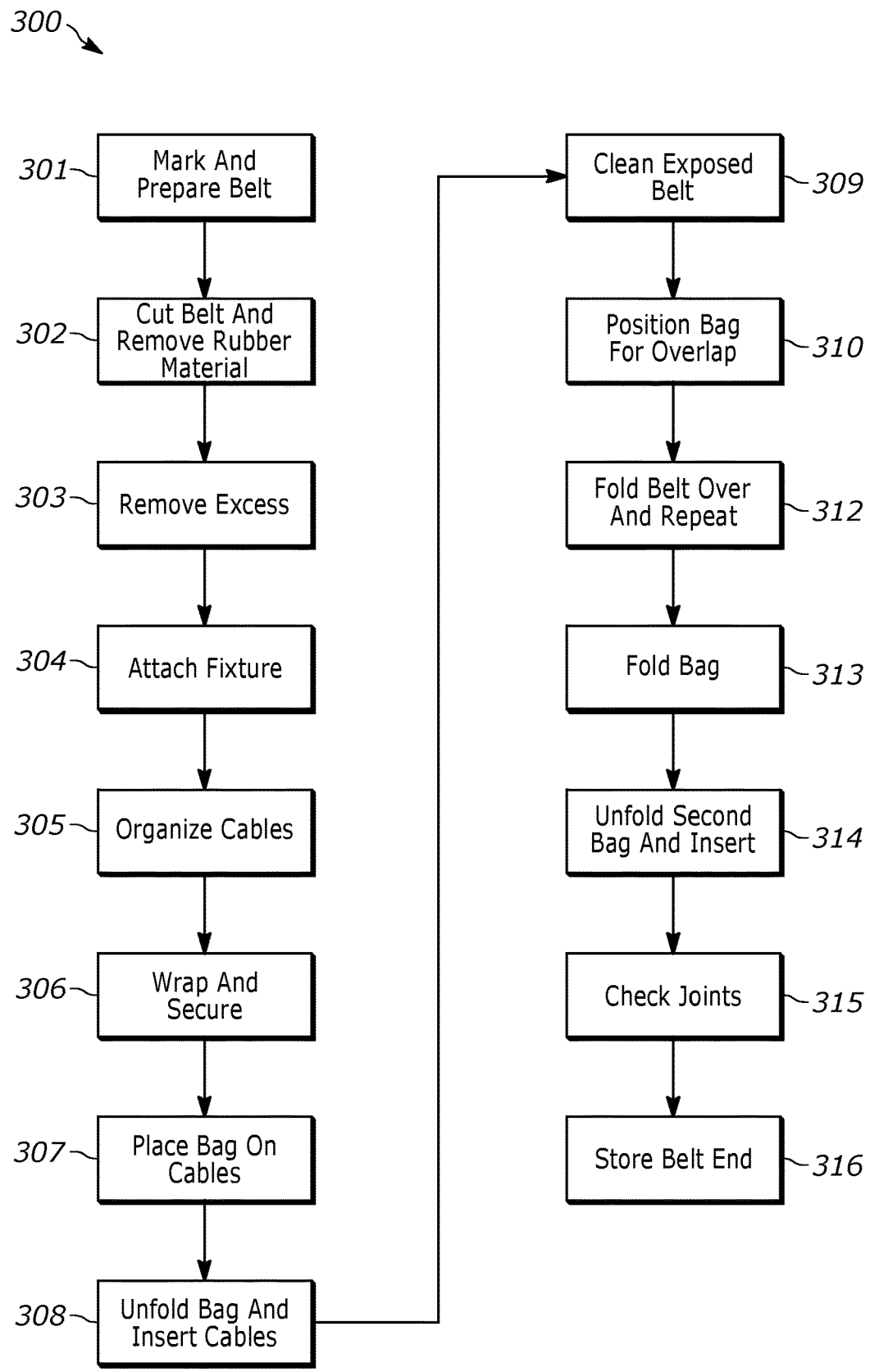
FIG. 3 is a diagram illustrating the method 300 of generating the encapsulated belt containment system 100 in accordance with one or more embodiments.

FIG. 3 is a diagram illustrating the method 300 of generating the encapsulated belt containment system 100 in accordance with one or more embodiments. It is appreciated that suitable variations in the method 300 are contemplated.

Further, it is appreciated that the method 300 can include additional blocks or steps and omit recited blocks or steps in suitable variations of the method 300.

At 301 and, mark-out and prepare a belt end 102 consistent with suitable procedures, such as belt manufacturers splice pattern and written splice procedures.

A portion of a belt is marked out and is prepared for splicing. In one example, this is performed according to belt manufacturer splice procedures.

At 302 and FIG. 2A, cut belt 102 and remove rubber material.

At 303, excess rubber is removed from cables or fabric carcass 104. Cover rubber surfaces should not be buffed or roughened.

FIG. 2B shows the belt 102 end with excess rubber 224 that can be removed. The steel cables 104 are exposed.

At 304 and FIG. 2C, a section 228 of the belt is left on the belt end 102 to allow a pulling plate or fixture to be attached and keep the cables in alignment. In one example, the section 228 is a 1 meter section.

The exposed portion or end 226 is also shown in FIG. 2C.

At 305 and shown in FIG. 2D, the cables/cord 104 can be organized into a plurality of groups 208 and cable tied together if no pulling tab is left on the belt end.

At 306 and shown in FIG. 2E, free cord-ends of the cables 104 are wrapped using an adhesive tape 210 and inside a clean oil-free cotton rag 230.

The adhesive tape should be applied to the rag instead of directly on the exposed steel cords 104 (or fabric carcass). If the belt end is being wrapped to the inside of the belt-reel, care must be taken to ensure cables are arranged so as not mechanically damage or kink the cables under the weight of the rolled belt.

At 307 and shown in FIG. 2F and shown in FIG. 2F, place a descant bag 232 on top of the cables 104. The descant bag 232 is configured to mitigate moisture. Desiccant bags are packets filled with material that absorbs moisture.

At 308 and shown in FIG. 2G, unfold a first containment bag 234 (e.g., labelled #1) and maneuver the belt end 102 and exposed splice area 226 into the bag.

Note: for larger belts, the belt-end can be folded back from the work-area and the bag cut and placed on the work-table to allow the belt-end to be folded and lowered back down into place over the bag ready to be wrapped.

At 309 and shown in FIG. 2H, a solvent or the like is used to create a clean area 236. A suitable cleaning solvent with an oil-free rag can be used to clean the exposed area and generate the clean area 236. The exposed belt cover surface is cleaned from the splice skives/cables 104 back approximately 500 mm removing dust, dirt and contaminants.

At 310 and shown in FIG. 2I, the containment bag 234 is positioned so that the bag ends overlap the splice skives/cables 104 by a suitable amount, such as approximately 200 mm.

At 311 and shown in FIG. 2J, seal the containment bag 234 end to a top surface of the belt 102 ensuring at least 100 mm of contact between the adhesive tape 236 and the belt and at least 100 mm overlap of adhesive tape 236 and containment bag 234.

At 312 and shown in FIG. 2K, the belt 102 can be folded over and blocks 301 to 311 repeated for an underside of the belt 102.

At 313 and shown in FIGS. 2L and 2M, fold a bottom (e.g., 200 mm) of the bag back on to itself and tape the folded portion onto the bag 234 for the full width of the bag.

At 314, unfold a second containment bag 238 (labelled #2) and place the first containment bag 234 into the second containment bag 238.

Take care to position the bottom of bag #2 about 200 mm below the end of bag #1 so that the bottom of bag #2 can be folded over and taped in the same way as bag #1.

At 315, check joints to ensure the splice area is well sealed. Also check the containment bags 234 and 238 for any cuts or perforations and seal with adhesive tape if required.

At 316 and shown in FIG. 2N, the belt-end 102 is ready to be staged for storage and installation.

Store the belt end according to manufacturers recommendations.

Additionally, ensure encapsulated belt-ends are; a) Stored off the ground b) Stored in places that are not prone to excessive water build-up or flooding c) NOT positioned under heavy loads (such as under belt reels) d) NOT run over by heavy equipment.

Figure 4:
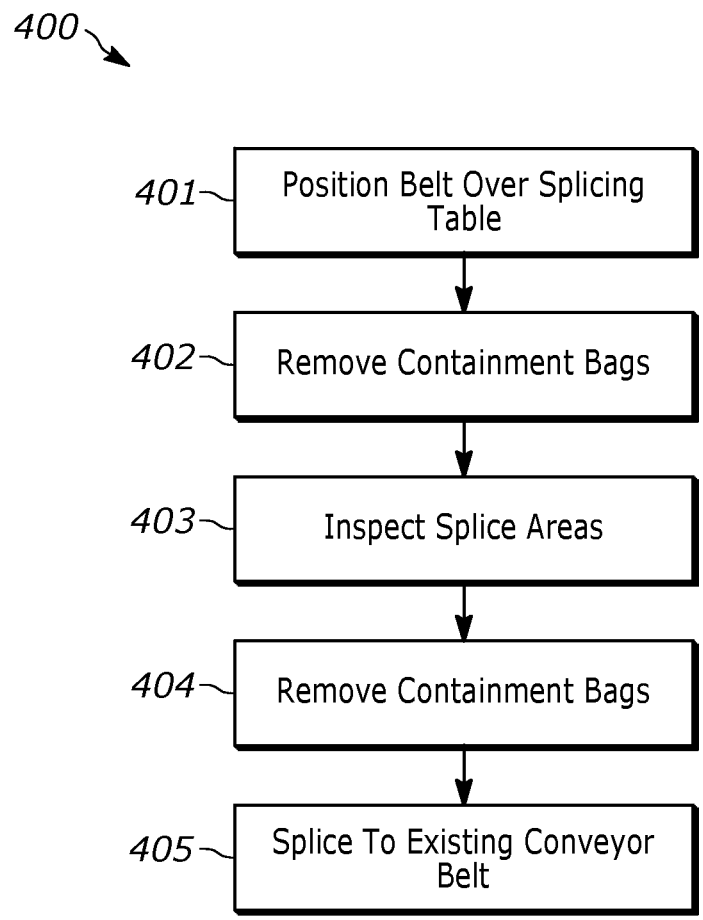
FIG. 4 is a flow diagram illustrating a method 400 of pulling the belt end 102 onto a conveyor system in accordance with one or more embodiments.

FIG. 4 is a flow diagram illustrating a method 400 of pulling the belt end 102 onto a conveyor system in accordance with one or more embodiments. It is appreciated that suitable variations are contemplated.

Generally, it is appreciated that care should be taken not to damage the containment bags when pulling belt from a belt reel (or other similar equipment) and onto a conveyor system. Visually check the conveyor system to ensure there are no sharp objects or features the containment bags could potentially be caught up and damaged on. Additionally, disengage and move all belt cleaners away from the belt (scrappers, vee-ploughs etc.). It is also recommended that a spotter walk with the belt-end during the installation and visually monitor the containment bag along the conveyor system.

The method 400 begins at 401, where the belt end(s) are positioned over a splice table to begin splicing. The containment bags 234 and 238 can be inspected for damage, perforations and the like.

Further, it is appreciated that the method 400 can include additional blocks or steps and omit recited blocks or steps in suitable variations of the method 400.

The containment bags 234 and 238 are opened at 402. In one example, carefully open the containment bags using an Olfa knife with care not to cut or damage the rubber covers or carcass.

Inspect the splice areas at 403. Inspect the splice area surfaces for any signs of dust, moisture of other contaminants. If contaminants are found, perform corrective actions. This includes the cables 104.

Remove the containment bags 234 and 238, tape and the like at block 404. Remove the containment bags and tape from the belt ends so splicing works can begin. Remaining adhesive from the containment tape can be removed from the rubber belt covers following splice vulcanization with a light buff.

Splice the belt ends to an existing conveyor belt at 405. Additional splices can be attached to the conveyor belt as needed. As a result, a continuous conveyor belt can be achieved and operation of a conveyor belt system can be resumed.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

One general aspect includes a method for generating an encapsulated belt containment system. The method also includes cutting a belt and removing rubber material from a portion of the belt to generate exposed belt end. The method also includes removing excess material from exposed cables of the exposed belt end. The method also includes organizing exposed cables into a plurality of cable groups and secure each group. The method also includes inserting the plurality of cable groups into a containment bag.

Implementations may include one or more of the following features. The method may include marking and preparing the belt for splicing. The method may include attaching a pulling plate or fixture to a non-exposed end of the belt end. The method may include wrapping each group of the plurality of cable groups. The method may include wrapping each group with a textile material. The method may include attaching a moisture control mechanism to the exposed cables prior to inserting the plurality of cable groups into the containment bag. The method may include sealing the containment bag. The method where sealing may include folding an end of the containment bag and securing a folded end with an adhesive. The method may include inserting the containment bag into a second containment bag. The method may include sealing the second containment bag. The method may include storing the belt end after inserting the plurality of cable groups into the containment bag. The containment bag may include a puncture resistant material, such as poly vinyl chloride. The method may include using an adhesive tape to secure each group. The method may include: removing the belt end from storage; removing one or more containment bags from the exposed end of the belt end; removing contaminants from the exposed belt end; and attaching the belt end to a conveyor belt of a conveyor belt system. The method the belt may include a plurality of elastomeric material layers. The method the plurality of cable groups may include steel cables. The one or more containment bags may include a first containment bag covering a plurality of cable groups. The method the plurality of cable groups may include textile materials. Implementations of the described techniques may include hardware, a method or process, or computer software on a computer-accessible medium.

One general aspect includes a method of pulling a belt end onto a conveyor belt. The method of pulling also includes removing a belt end from storage; removing one or more containment bags from an exposed end of the belt end, and removing contaminants from the exposed belt end, and attaching the belt end to a conveyor belt of a conveyor belt system.

One general aspect includes an encapsulated belt containment system including a conveyor belt having an exposed end. The encapsulated belt containment system also includes the exposed end having a plurality of cable groups, the cable groups may include steel cables and wrapped. The encapsulated belt containment system also includes a first containment bag secured and containing the exposed end and the cable groups. The encapsulated belt containment system also includes a second containment bag containing the first containment bag and sealingly attached to the conveyor belt.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially-relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially-relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially-relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for generating an encapsulated belt containment system, the method comprising:
    marking and preparing a belt end with a splice pattern;
    cutting a belt and removing rubber material from a portion of the belt at the belt end to generate an exposed belt end;
    removing excess material from exposed cables of the exposed belt end;
    organizing exposed cables into a plurality of cable groups and securing each group;
    inserting the plurality of cable groups into a containment bag;
    wrapping each group of the plurality of cable groups;
    wrapping each group with a textile material;
    marking and preparing the belt for splicing; and
    attaching a pulling plate to a non exposed end of the belt end; and
    attaching a moisture control mechanism in the form of a desiccant bag to the exposed cables prior to inserting the plurality of cable groups into the containment bag.

2. The method of claim 1, further comprising sealing the containment bag.

3. The method of claim 2, where sealing comprises folding an end of the containment bag and securing a folded end with an adhesive.

4. The method of claim 1, further comprising inserting the containment bag into a second containment bag.

5. The method of claim 4, further comprising sealing the second containment bag.

6. The method of claim 1, further comprising storing the belt end after inserting the plurality of cable groups into the containment bag.

7. The method of claim 1, wherein the containment bag comprises a puncture resistant material comprising poly vinyl chloride.

8. The method of claim 1, further comprising using an adhesive tape to secure each group.

9. The method of claim 1, further comprising:
    removing the belt end from storage;
    removing one or more containment bags from the exposed end of the belt end;
    removing contaminants from the exposed belt end; and
    attaching the belt end to a conveyor belt of a conveyor belt system.

10. The method of claim 1, wherein the belt comprises a plurality of elastomeric material layers.

11. The method of claim 1, wherein the plurality of cable groups comprises steel cables.

12. The method of claim 1, wherein the plurality of cable groups comprises textile materials.

* * * * *